April 6, 1965 G. W. STROH 3,177,010
ACCOUNTING SET
Filed Feb. 26, 1963
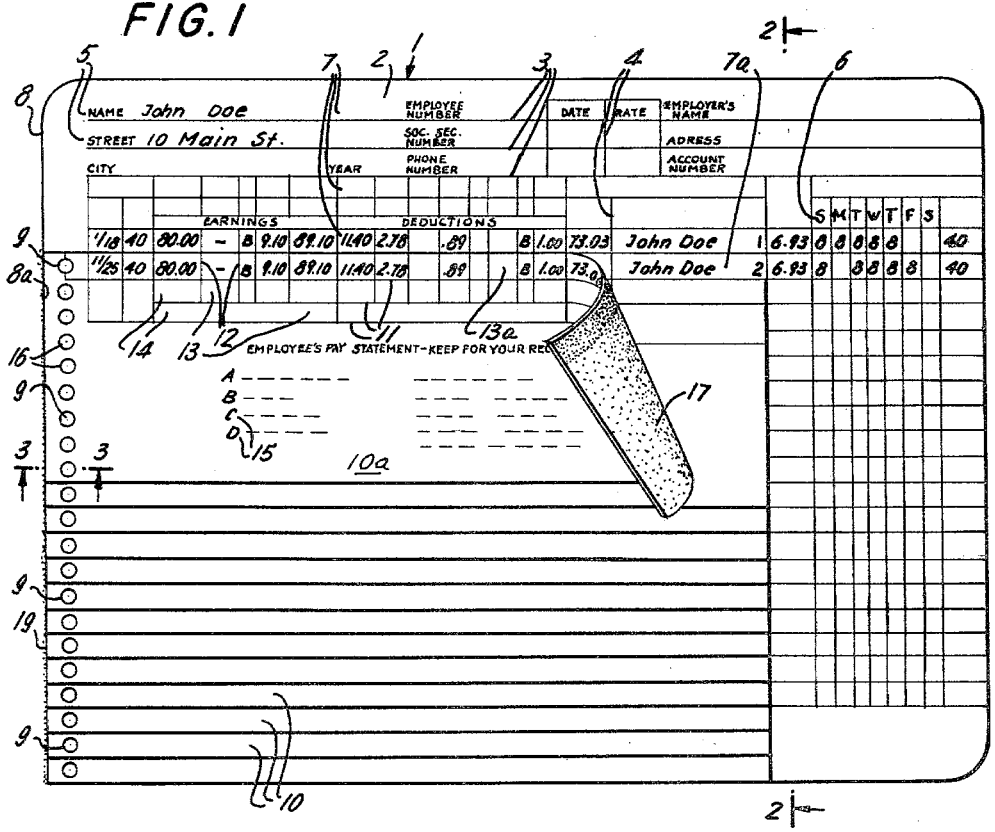
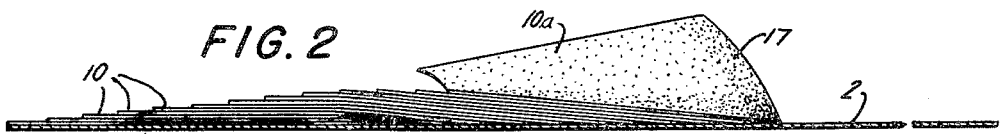
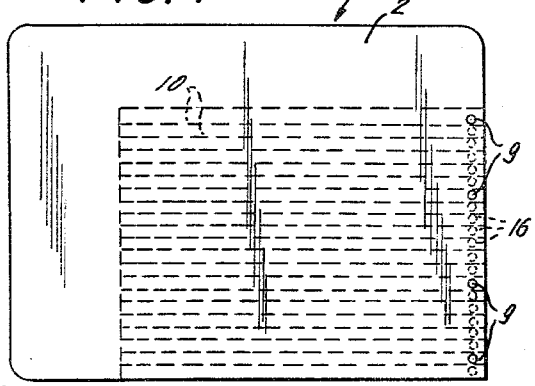
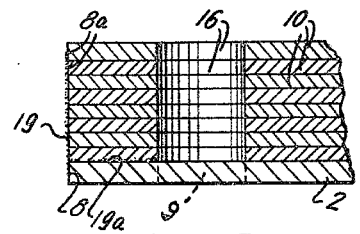
INVENTOR.
GEORGE W. STROH
BY
Curtis, Morris & Safford.
ATTORNEYS

3,177,010
ACCOUNTING SET
George W. Stroh, 272 E. Madison St., Lancaster, Pa.
Filed Feb. 26, 1963, Ser. No. 261,058
4 Claims. (Cl. 282—23)

This invention relates to a business form, and more particularly, to an accounting set for simultaneous entry of data on separate sheets.

One of the objects of the instant invention is to provide a novel accounting set which facilitates the entry of data simultaneously on a permanent record and on a detachable record. Another object of the invention is to provide an improved accounting set which expedites payroll accounting and is especially adapted for use in small businesses. A further object is to provide an improved accounting set which is of simple and compact construction, adapted for economical manufacture and one which is adapted to a wide variety of applications requiring multiple data entry. Another object is to provide a novel method of making an accounting set of superimposed sheets.

Other objects of the invention will be in part discussed hereinafter and in part obvious to those skilled in the art.

In order to point out more fully the nature of the present invention, reference will now be made to the accompanying drawing which illustrates a preferred embodiment of the invention. It is of course to be understood that the embodiment of the invention illustrated and described is not intended to limit in any way the scope of the instant invention and that numerous changes can be made in the construction and arrangement of parts by persons skilled in the art without departing from the spirit or scope of the invention as defined in the claims appended hereto.

In the drawing:

FIGURE 1 is a plan view of an accounting set incorporating the novel features of the present invention and showing an employer payroll ledger sheet and a plurality of employee payroll statement sheets attached thereto;

FIGURE 2 is a section view taken along the line 2—2 of FIGURE 1 and shows an employer payroll ledger sheet and a plurality of employee payroll statement sheets attached thereto in side elevation;

FIGURE 3 is an enlarged sectional view taken along line 3—3 of FIGURE 1 across one edge portion of the set to show the aligned perforations in the form of punched holes in the plurality of employee payroll statement sheets; and FIGURE 4 is a bottom plan view of the accounting set to show the spaced perforations in the ledger sheet aligned with one group of perforations in the employee payroll statement sheets.

The accounting set or form of the present invention as illustrated in the drawings is adapted for use in small businesses by an employer not skilled in accounting practices to keep records, or by an accountant who services a number of small businesses. It will be understood, however, that the set may have other uses and may be used in accounting systems for large businesses or with business machines and computers.

Referring to FIGURE 1 of the drawings, the accounting form 1 in the illustrated embodiment comprises a ledger sheet 2 having a number of horizontal and vertical lines 3 and 4, respectively, and a number of words and symbols 5 and 6, respectively, printed thereon. The lines 3 and 4 form a plurality of data entry spaces 7, such as boxes, appropriate for an employer's permanent payroll record, and the words and symbols 5 and 6 indicate the nature of the data to be entered in each data entry space. Near the left edge 8 of the ledger sheet 2 are four spaced perforations 9 in the form of punched holes.

Mounted on the ledger sheet 2 and overlying the top thereof are a plurality of identical employee payroll statement sheets 10. Printed on each of the employee sheets 10 are horizontal and vertical lines 11 and 12, respectively, which form data entry spaces 13 and at least one data entry space 13a which corresponds to a data entry space 7a on the ledger sheet 2. Also printed on the employee sheet are a number of words 14 indicating the appropriate data to be entered in each space 13 as well as explanatory symbols 15 for the employee's benefit. Near the left edge 8a of each employee sheet 10 are nine equally spaced perforations 16 in the form of punched holes. FIGURE 4 shows more clearly the relationship between the ledger sheet 2, perforations 9 and the perforations 16 in the employee sheet 10. In this embodiment of the accounting set 1 there are five employee sheet perforations 16 between the first and second, and third and fourth ledger sheet perforations 9, reading from the top, and six perforations 16 between the second and third perforations 9. The spacing of the perforations 9, 16 facilitate assembly of the accounting set as later discussed in more detail.

The reverse side 17 of employee sheet 10a which has been shown partially turned away from the ledger sheet 2 in FIGURE 1 is coated with a pressure sensitive transfer medium. The ledger sheet 2 also is coated with a medium complementary to the coating on the employee sheets 10 such that when coated surface of the employee sheets 10 is in contact with the coated ledger sheet 2, a data entry impressed on the employee sheets produces an identical marking on the ledger sheet 2. Such materials are known and supplied by the National Cash Register Co. as coated "no carbon required" stock. However, the front surface of the employee sheets are not so coated so that markings on the employee sheets will not be transferred to an underlying adjacent employee sheet.

Still with reference to FIGURE 1, the employee sheets 10 are arranged on the ledger sheet 2 in overlapping relation and offset to one another a distance of one data entry space 13a. FIGURE 2 illustrates more clearly the consecutive overlapping arrangement of the employee sheets 10 on the ledger sheet 2. The overlapping employee sheets 10 are aligned so that a data entry space 13a of each employee sheet 10 is superimposed directly over a corresponding data entry space 7a on the ledger sheet 2 in consecutive order. Thus, when the accounting form 1 is used, an entry made on a data entry space 13a on an employee sheet 10 is duplicated on the corresponding data entry space 7a on ledger sheet 2 beneath the employee sheet 10 by the pressure sensitive cooperating coated media on the two sheets. A layer of adhesive 19 is applied to the left edges 8 of the employee sheets 10 to detachably hold the sheets in a self contained unit stack. A unit stack of employee sheets 10 are mounted on and attached to the ledger sheet 2 by a strip of adhesive between the ledger and employee sheets on the left hand edge thereof as illustrated in FIGURE 3. Thus, only one ninth of an employee sheet in the illustrated embodiment is attached to the ledger sheet which holds the parts assembled, but facilitates easy detachment.

In accordance with another feature of the present invention a novel method of making the accounting set is provided. In a preferred method, a plurality of groups of employee sheets 10 are assembled, and properly overlapped and aligned on a jig. The adhesive 19 is then applied to the surface at the left edges 8a of the sheets 10 to secure them together in successive layers. The assembly of employee sheets is then divided into accounting units of the desired number of sheets. Each stack of sheets of an accounting unit is then placed over a ledger sheet 2 mounted on a second jig. The second jig has four posts passing through the ledger sheet perforations 9 and the stack of employee sheets 10 is aligned on the ledger sheet 2 by passing four of the employee sheet perforations 16 over the posts. A strip of adhesive 19a is first placed on the ledger sheet 2 intermediate the row of perforations 9 and the near edge thereof after the ledger sheet 2 has been mounted on the jig and before the stack of employee sheets 10 is placed on the ledger sheet 2. The adhesive 19, 19a then serves to hold the employee sheets 10 to the ledger sheet 2 in proper alignment but enables the employee sheets 10 to be readily detached from the ledger sheet. FIGURE 3 shows more clearly the assembled employee sheets 10 on the ledger sheet 2, the alignment of the perforations 16 and the adhesive 19 applied to the surface of the edges 8 and 19a to the ledger sheet 2. Preferably, the adhesive 19 is a fast drying, brittle material which permits easy detachment without affecting the remaining employee sheets due to the spacing between the offset edges of the sheet. The adhesive 19a, on the other hand, is a slow drying adhesive which is absorbed in the paper to hold the sheets 10 to the ledger sheet 2 more securely.

It will of course be understood that the specific embodiment described above may be modified in various ways within the scope of the invention. For example, the adhesive material 19 may also be applied in a strip between the edge 8a and the perforations 16 on each employee sheet 10 to hold the employee sheets more securely one to another and to the ledger sheet 2. In this latter instance, the employee sheets 10 can be readily detached by tearing along the line of the perforations 16. Rather than a coating of pressure sensitive material over the entire reverse side 17 of the employee sheets 10, a strip of spot carbon or coating could be applied on the reverse side of the employee sheet 10 of a width corresponding to the offset spacing of the sheets. The accounting form 1 of the present invention can be adapted to virtually any type of forms requiring multiple entry of data, for example, invoices, sales slips, and receipt forms, by printing lines to form spaces for appropriate data entries. In addition, the accounting set 1 can be used for more than duplicate entries by using multiple record sheets either inserted in or detachably connected to the ledger sheet so that duplicate ledger sheets may be provided for the employer and his accountant. While the accounting set is intended for a particular purpose, it can be used with sheets for use as a listing of a sequence of transactions as a proof sheet. When such insert sheets are used, the construction of the set facilitates visual alinement of the insert in the set.

I claim:

1. An accounting form comprising a ledger sheet having columns and data entry spaces thereon and a plurality of auxiliary record sheets each having columns and a data entry space thereon corresponding to the columns and one data entry space on said ledger sheet, said record sheets being arranged in offset alignment so that a portion of each record sheet overlaps the top edges of other record sheets and so that said data entry space on said record sheet is superimposed directly over a corresponding data entry space on said ledger sheet, said record sheets being detachably attached to one another by a layer of adhesive applied to the surface formed by their aligned edges, the contiguous surfaces between any two record sheets being substantially free of said adhesive, and said record sheets being detachably attached to said ledger sheet by a strip of adhesive in the margin of said ledger sheet inwardly from an edge thereof so that each record sheet is attached to said ledger sheet by said strip of adhesive in that portion of the record sheet overlapping the top edges of other record sheets and directly superimposed on said ledger sheet, whereby said record sheets can be used consecutively for the entry of data and thereafter removed completely from said form without being torn or disturbing other record sheets.

2. An accounting form according to claim 1 wherein the overlapping portion of each record sheet is coated with a pressure sensitive material for imprinting on the underlying ledger sheet.

3. An accounting form according to claim 1, wherein the undersurface of said record sheets and the surface of said ledger sheet are coated with cooperating pressure sensitive media for reproducing only one said ledger sheet any imprints made on said record sheets.

4. A method of making a self-contained accounting set having a ledger sheet with columns and spaces for entry of appropriate data and a plurality of auxiliary record sheets having columns and a space for data entry corresponding to a data entry space on said ledger sheet which comprises aligning the edges at one side of a group of said record sheets, offsetting each successive record sheet in said group over the top edge of the underlying record sheet a distance equal to said data entry space on said record sheet, applying an adhesive to the surface formed by the aligned edges of said group of record sheets, the contiguous surfaces between any two record sheets being substantially free of adhesive, applying a strip of adhesive in the margin on the surface of said ledger sheet inwardly of the edge corresponding to the aligned edges of said record sheets, mounting and aligning said group of record sheets on said ledger sheet so the data entry space of each record sheet is superimposed directly over a corresponding data entry space on said ledger sheet, whereby said group of record sheets is secured to said ledger sheet by said strip of adhesive in the margin and each record sheet is detachably attached to said ledger sheet only by the portion of said record sheet offset from other record sheets and directly overlying a portion of said adhesive strip on said ledger sheet.

References Cited by the Examiner

UNITED STATES PATENTS

| 2,524,128 | 10/50 | Jones | 282—29.2 |
| 2,597,579 | 5/52 | Gleaves | 282—29.2 |
| 2,647,765 | 8/53 | Brechner | 282—29.2 |
| 2,976,062 | 3/61 | Brechner | 282—29.2 |
| 3,048,426 | 8/62 | Rodriguez et al. | 282—23 |

FOREIGN PATENTS 607,428   8/48   Great Britain.

JEROME SCHNALL, *Primary Examiner.*

LAWRENCE CHARLES, *Examiner.*

UNITED STATES PATENT OFFICE
CERTIFICATE OF CORRECTION

Patent No. 3,177,010                                                 April 6, 1965

George W. Stroh

It is hereby certified that error appears in the above numbered patent requiring correction and that the said Letters Patent should read as corrected below.

In the heading to the printed specification, line 3, for "272 E. Madison" read -- 722 E. Madison --.

Signed and sealed this 22nd day of February 1966.

(SEAL)
Attest:

ERNEST W. SWIDER
Attesting Officer

EDWARD J. BRENNER
Commissioner of Patents